United States Patent
Dorovsky

(10) Patent No.: US 9,581,720 B2
(45) Date of Patent: Feb. 28, 2017

(54) FINDING OIL VISCOSITY AND SURFACE TENSION BY MEANS OF DIELECTRIC SPECTROSCOPY

(75) Inventor: Vitaly N. Dorovsky, Novosibirsk (RU)

(73) Assignee: BAKER HUGHES INCORPORATED, Houston, TX (US)

( * ) Notice: Subject to any disclaimer, the term of this patent is extended or adjusted under 35 U.S.C. 154(b) by 632 days.

(21) Appl. No.: 13/991,029

(22) PCT Filed: Jul. 16, 2012

(86) PCT No.: PCT/RU2012/000569
§ 371 (c)(1),
(2), (4) Date: May 31, 2013

(87) PCT Pub. No.: WO2014/014372
PCT Pub. Date: Jan. 23, 2014

(65) Prior Publication Data
US 2014/0019049 A1     Jan. 16, 2014

(51) Int. Cl.
*G01V 3/30* (2006.01)
*G01V 3/38* (2006.01)
(Continued)

(52) U.S. Cl.
CPC .................. *G01V 3/30* (2013.01); *G01V 3/18* (2013.01); *G01V 3/28* (2013.01); *G01V 3/38* (2013.01)

(58) Field of Classification Search
CPC ... G01V 3/18; G01V 3/28; G01V 3/30; G01V 3/38
(Continued)

(56) References Cited

U.S. PATENT DOCUMENTS 5,059,907 A * 10/1991 Sherman .................. G01V 3/38
324/323
5,869,968 A    2/1999 Brooks et al.
(Continued)

FOREIGN PATENT DOCUMENTS

WO    2006-105432 A2    10/2006

OTHER PUBLICATIONS

Kelleners, T.J. et al., "Frequency Dependence of the Complex Permittivity and Its Impact on Dielectric Sensor Calibration in Soils," Soil Sci. Soc. Am. J. 69, pp. 67-76 (Jan. 31, 2005).
(Continued)

*Primary Examiner* — John H Le
(74) *Attorney, Agent, or Firm* — Mossman Kumar & Tyler PC

(57) ABSTRACT

The present disclosure relates to methods and apparatuses for evaluating an earth formation using complex dielectric permittivity. The method may include estimating at least one property of the earth formation using a real part and an imaginary part of complex permittivity at a plurality of frequencies. The at least one property may include one or more of: oil viscosity and surface tension of a water-oil system. The method may include performing dielectric permittivity estimates using an electromagnetic tool in a borehole. The apparatus may include the electromagnetic tool and at least one processor configured to store information obtained by the electromagnetic tool in a memory. The at least one processor may also be configured to estimate at least one property of the earth formation.

14 Claims, 8 Drawing Sheets

(51) Int. Cl.
  *G01V 3/18* (2006.01)
  *G01V 3/28* (2006.01)
(58) Field of Classification Search
  USPC .......... 702/6, 7, 11; 166/248; 324/323, 324,
        324/333, 338, 343
  See application file for complete search history.

(56) References Cited

U.S. PATENT DOCUMENTS

| | | |
|---|---|---|
| 2002/0173913 A1* | 11/2002 | Tabarovsky ............. G01V 3/28 |
| | | 702/7 |
| 2007/0061083 A1 | 3/2007 | Habashy et al. |
| 2009/0200016 A1 | 8/2009 | Goodwin et al. |
| 2011/0198078 A1 | 8/2011 | Harrigan et al. |
| 2011/0251795 A1 | 10/2011 | Difoggio |
| 2014/0207382 A1* | 7/2014 | Dorovsky ................ G01V 3/30 |
| | | 702/7 |

OTHER PUBLICATIONS

Raju, Gorur G., "Dielectric in Electric Fields," CRC Press, XP055066635, pp. 140-141 (Dec. 31, 2003).
Written Opinion in PCT/RU2012/000569, dated Jun. 24, 2013.

* cited by examiner

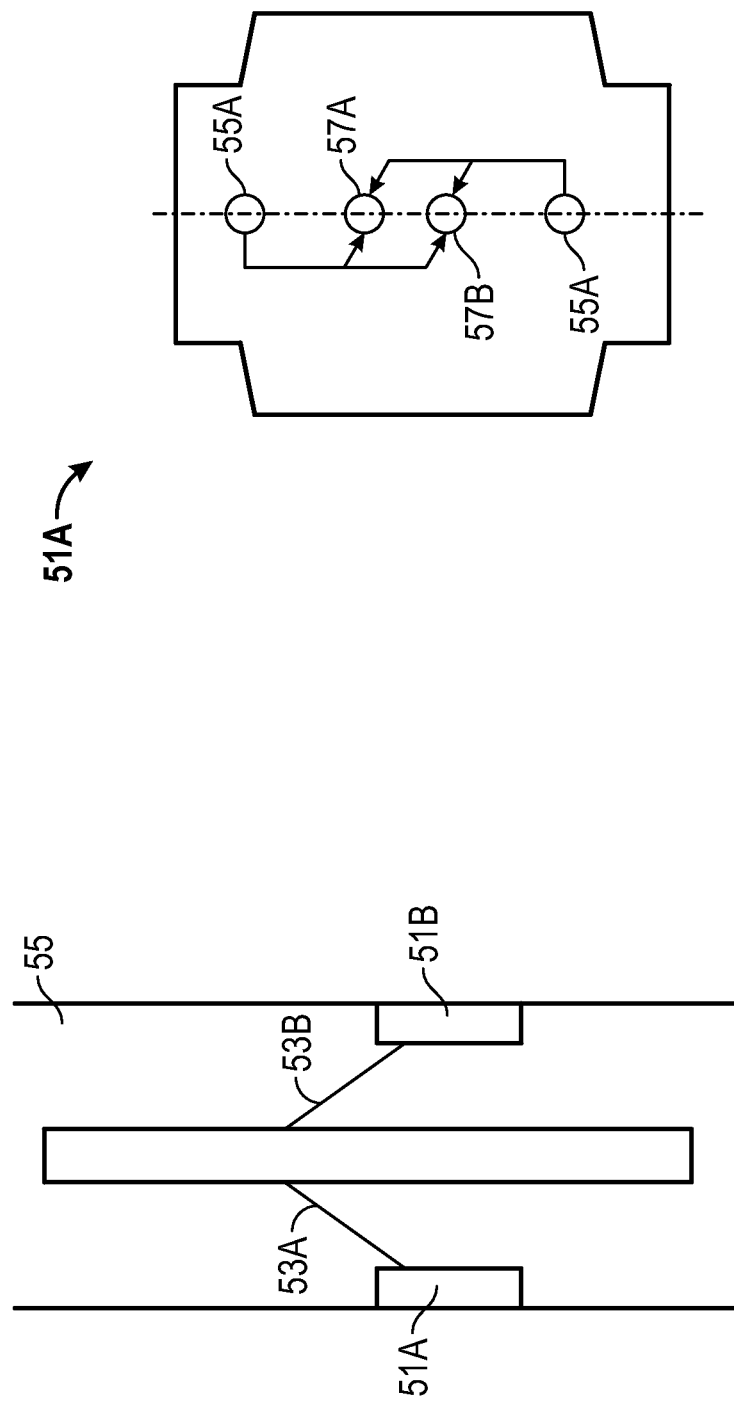

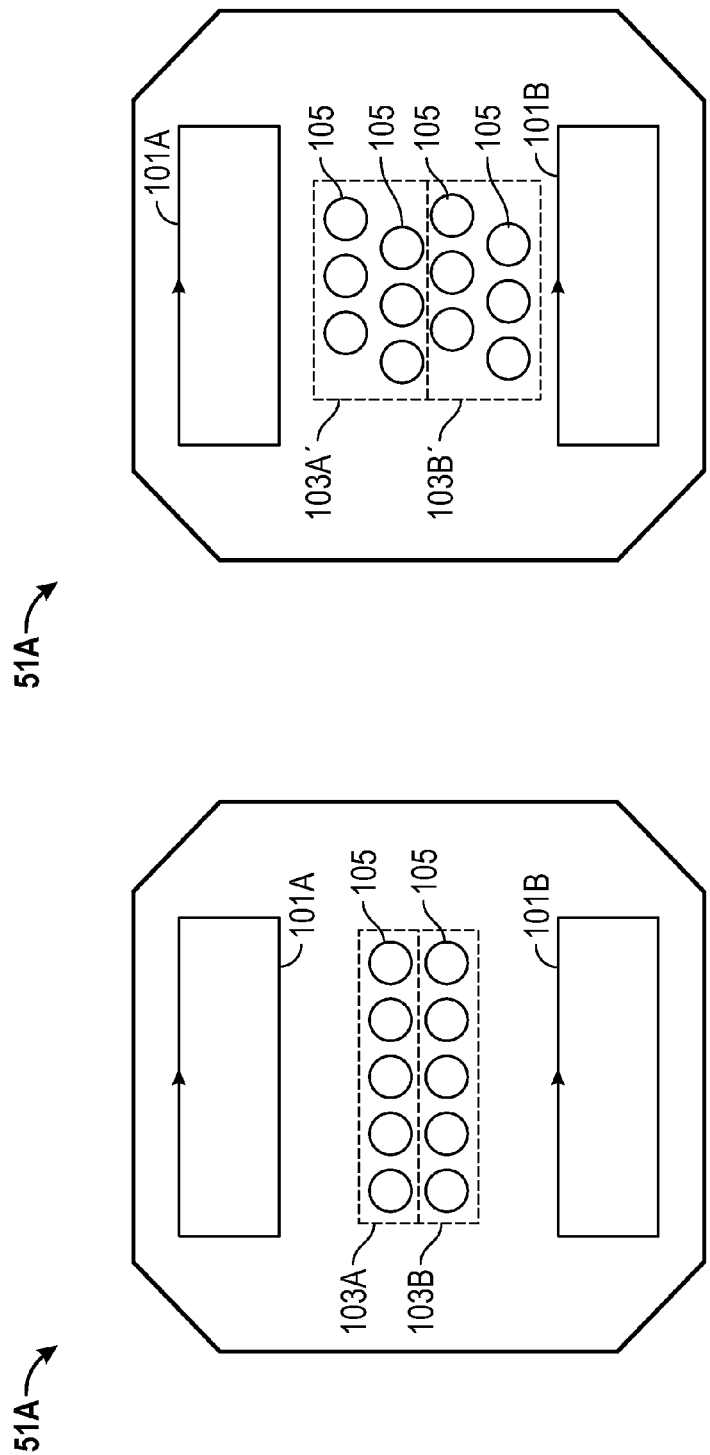

FINDING OIL VISCOSITY AND SURFACE TENSION BY MEANS OF DIELECTRIC SPECTROSCOPY

BACKGROUND OF THE DISCLOSURE

1. Field of the Disclosure

This disclosure generally relates to exploration and production of hydrocarbons involving investigations of regions of an earth formation penetrated by a borehole. More specifically, the disclosure relates to the dielectric spectroscopy of an earth formation using a logging tool in a borehole.

2. Description of the Related Art

Electrical earth borehole logging is well known to persons having an ordinary level of skill in the art, and various devices and various techniques have been described for this purpose. Broadly speaking, there are two categories of electrical logging apparatus. In the first category, one or more measurement electrodes—current source(s) or sink(s)—are used in conjunction with a return electrode (which may be a diffuse electrode such as a logging tool's body or mandrel). A measurement current flows in a circuit that connects a current source to the measurement electrode(s), through the earth formation to the return electrode, and back to the current source in the tool. In a second category, that of inductive measuring tools, an antenna within the measuring instrument induces a current flow within the earth formation. The magnitude of the induced current is detected using either the same antenna or a separate receiver antenna. The present disclosure belongs to the second category.

SUMMARY OF THE DISCLOSURE

In view of the foregoing, the present disclosure is directed to a method and apparatus for estimating at least one property using dielectric spectroscopy of subterranean formations penetrated by a borehole.

One embodiment according to the present disclosure includes A method of evaluating an earth formation, the method comprising: estimating at least one property of the earth formation using a real part and an imaginary part of a permittivity of the earth formation at a plurality of frequencies, where the real parts and the imaginary parts are based on measurements obtained using an electromagnetic tool in a borehole penetrating the earth formation.

Another embodiment according to the present disclosure includes An apparatus for evaluating an earth formation, the apparatus comprising: a carrier configured to be conveyed in a borehole penetrating the earth formation; a electromagnetic tool disposed on the carrier and configured to make measurements indicative of an imaginary part and a real part of a permittivity of the earth formation at a plurality of frequencies; and at least one processor configured to: estimate the real part and the imaginary part of the permittivity of the earth formation at the plurality of frequencies, and estimate at least one property of the earth formation using the real parts and imaginary parts.

Another embodiment according to the present disclosure includes a non-transitory computer-readable medium product having instructions thereon that, when executed, cause at least one processor to perform a method, the method comprising: estimating at least one property of the earth formation using a real part and an imaginary part of a permittivity of the earth formation at a plurality of frequencies, where the real parts and the imaginary parts are based on measurements obtained using an electromagnetic tool in a borehole penetrating the earth formation.

BRIEF DESCRIPTION OF THE DRAWINGS

The present disclosure is best understood with reference to the accompanying figures in which like numerals refer to like elements and in which like numerals refer to like elements and in which:

FIG. 2A is a schematic view of an electromagnetic tool in accordance with one embodiment of the present disclosure;

FIG. 2B is a schematic view of a pad of an electromagnetic tool in accordance with one embodiment of the present disclosure;

FIG. 3A is a schematic of an antenna configuration for a pad of an electromagnetic tool for one embodiment according to the present disclosure;

FIG. 3B is a schematic of an antenna configuration for a pad of an electromagnetic tool for another embodiment according to the present disclosure;

DETAILED DESCRIPTION OF THE DISCLOSURE

Figure 1:
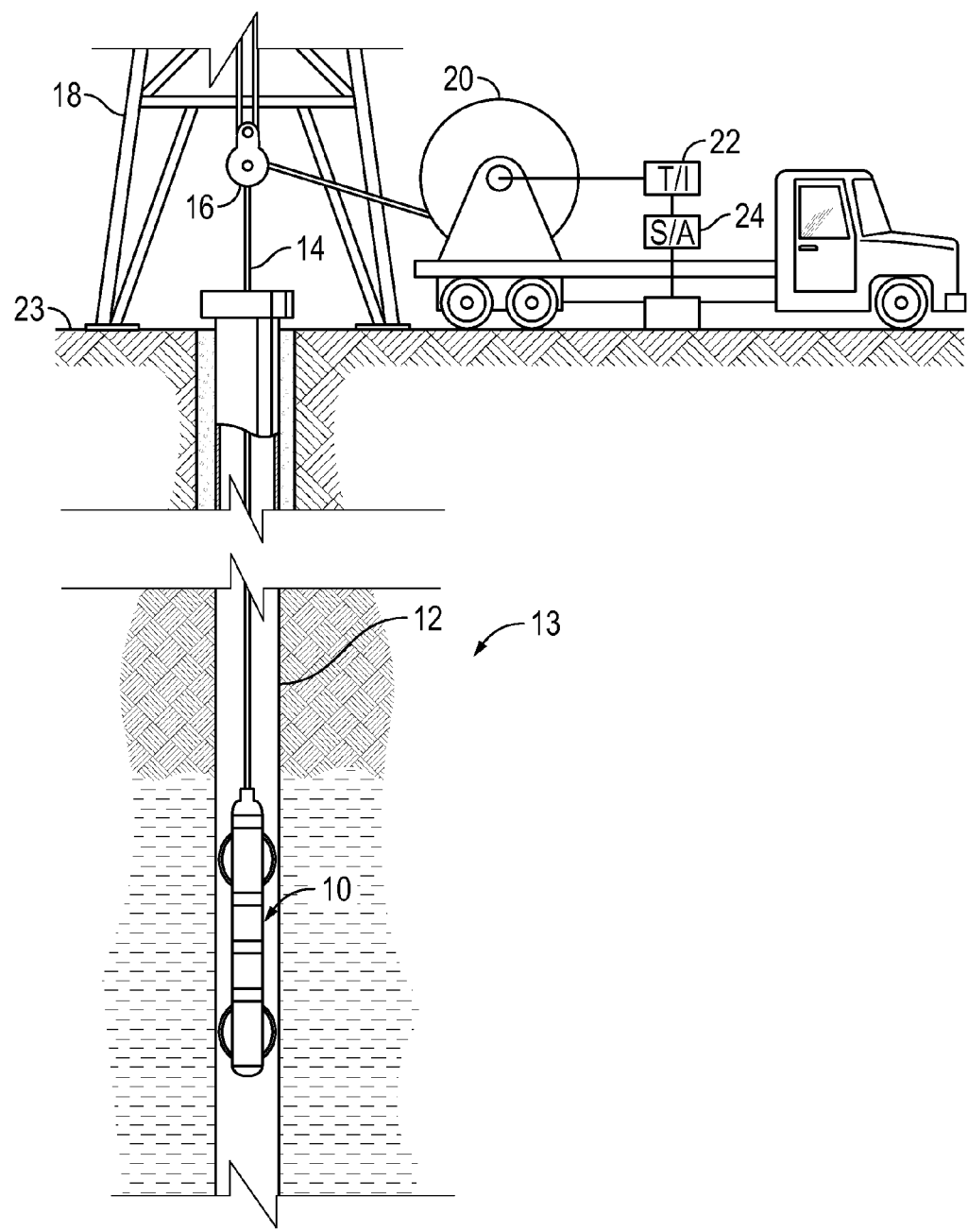
FIG. 1 is a schematic of a drilling site including an electromagnetic tool for estimating a parameter in an earth formation according to one embodiment of the present disclosure.

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering and programming practices for the environment in question. It will be appreciated that such development efforts may be complex and time-consuming, outside the knowledge base of typical laymen, but would nevertheless be a routine undertaking for those of ordinary skill in the relevant fields.

Dielectric spectroscopy includes the estimation of electric permittivity of materials. Electric permittivity may include imaginary and real parts, which may vary with the frequency of an electrical signal exposed to a material. In some aspects, electric permittivity may be estimated using an electromagnetic tool configured to generated an electric current at a plurality of frequencies.

In some aspects, the electromagnetic tool may include an inductive electromagnetic probe that may be electrically coupled to an earth formation from inside of a borehole penetrating the earth formation. Dielectric permittivity may be obtained by solving Maxwell equations. For a homogeneous medium, the relationship between a magnetic field, $H_z$, and dielectric permittivity, $\in$, may be expressed as:

$$H_r^0 = \frac{M_z rz}{4\pi R^5}(3 + 3kR + k^2R^2)e^{-kR}, \tag{1}$$

$$H_\varphi^0 = 0,$$

$$H_z^0 = -\frac{M_z}{4\pi R^3}\left(\frac{3r^2}{R^2} + \frac{3kr^2}{R} + k^2R^2 - 2 - 2kR\right)e^{-kR},$$

$$R^2 = r^2 + z^2, k^2 = -\omega^2\mu\varepsilon, \varepsilon = \varepsilon' + i\varepsilon''.$$

where $M_z$ is the receiver coil magnetic moment, k is a wave number, ω is a circular frequency, R is a radial distance, r and z are coordinates in the cylindrical coordinate system, μ is the permeability of the material, and $\in'$ and $\in''$ are real and imaginary parts of dielectric permittivity. The dielectric permittivity may be estimated using methods known to those of skill in the art, including, but not limited to one or more of: (i) a Newton method and (ii) a Marquardt-Levenberg method.

The estimated imaginary and real parts of permittivity of the earth formation may be used to estimate at least one property of the earth formation. The at least one property may include, but is not limited to: (i) oil viscosity and (ii) surface tension in a water-oil system.

If, for example, a dipole antenna configured to emit electromagnetic waves is placed in the center of the borehole with a receiver antenna located in the borehole at a certain distance from the transmitter, then real and imaginary parts of the magnetic field may be measured by the receiver antenna. A spectral image of dielectric permittivity may be generated using the imaginary and real parts of permittivity over a plurality of frequencies. The spectral image may also be referred to as a "spectral dielectric curve" and a "polarization curve". Each point on the spectral image of dielectric permittivity may correspond to a specific frequency in the electromagnetic spectrum. The oil viscosity and surface tension of a water-oil system in the earth formation may be estimated using the spectral image of dielectric permittivity. Embodiments of apparatuses and methods for estimating the oil viscosity and surface tension of a water-oil system in the earth formation are discussed below.

FIG. 1 shows an electromagnetic tool 10 suspended, in a borehole 12 penetrating earth formation 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The electromagnetic tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data. Some or all of the processing may also be done by using a downhole processor at a suitable location on the logging tool 10. While a wireline conveyance system has been shown, it should be understood that embodiments of the present disclosure may be utilized in connection with tools conveyed via rigid carriers (e.g., jointed tubular or coiled tubing) as well as non-rigid carriers (e.g., wireline, slickline, e-line, etc.). Some embodiments of the present disclosure may be deployed along with LWD/MWD tools.

The electromagnetic tool 10 may include at least one transmitting antenna and at least two receiving loop antennas mounted on a pad. The tool may be operated in at least two modes. A first mode may be referred to as Mini-MPR (Multiple propagation resistivity) mode that may measure attenuation and a phase difference between the two receivers. The electromagnetic tool 10 may also be operated in a second mode (an induction mode) in which a compensated magnetic field (voltage) may be measured. The current in the transmitter coil may induce a magnetic field in the earth formation 13. This magnetic field, in turn, may cause eddy currents to flow in the earth formation 13. Because of the presence of these formation currents, a magnetic field may be coupled into a receiver coil R thereby generating a receiver signal. Logging tools having "a receiver coil" and "a transmitter coil" each comprised of several coils arranged in a predetermined fashion to obtain a desired response may be used. The receiver signal may then be amplified and applied to one or more phase sensitive detectors (PSDs). Each PSD may detect a phase component signal having a phase identical to a phase reference signal which may also be applied to the detector. The phase reference signal may have a predetermined phase relationship to the current in the transmitter coil(s). The output of the PSD(s) may be further processed downhole, or may be sent uphole to surface equipment for processing or display to an operating engineer.

In the induction mode, one receiver loop coil may serve as a main receiver and the other as a bucking receiver. The transmitting antennas may include loops and/or electric dipoles. For loop transmitter antennas, the transmitters and receivers may be in one of three orientations. If the z-axis of the tool is parallel to the longitudinal axis of the tool, then the x-axis may be radial through the center of the pad, and the y-axis may be tangential to the pad. The zz-component may refer to a z-source and a z-receiver and so on. In some embodiments, xx-transmitters and receivers may be used.

FIG. 2A shows an electromagnetic tool 10 for one embodiment according to the present disclosure. The electromagnetic tool 10 may include a body 55 with two pads MA, MB extended on extension devices 53A, 53B. Two pads are shown for illustrative purposes and, in actual practice, there may be more pads. The extension devices 53A, 53B may be electrically operated, electromechanically operated, mechanically operated or hydraulically operated. With the extension devices 53A, 53B fully extended, the pads MA, MB can make contact with the borehole wall (not shown) and make measurements indicative of properties of the borehole wall. Orientation sensors (not shown) may provide an indication of the orientation of the electromagnetic tool 10. In addition, cable depth measurements may be obtained using a sensor (not shown) at the surface that measures the amount of cable spooled out. In addition, accelerometers may be used downhole to provide other measurements indicative of the depth of the electromagnetic tool 10. The orientation sensors may include accelerometers, magnetometers or gyroscopes. Depth may also be estimated from a gyro output.

An exemplary arrangement of dual transmitters and receivers on each of the pads is shown in FIG. 2B. Shown therein is pad 51A with two transmitters 55A, 55B disposed about two receivers 57A, 57B. Also depicted schematically by arrows in FIG. 2B are measurements that may be made by each of the two receivers 57A, 57B corresponding to signals generated by each of the two transmitters 55A, 55B.

The use of dual transmitters may provide a symmetrical response. The use of dual transmitters may also reduce effects of borehole rugosity. Also, the use of dual transmitters may reduce electronics-related errors in attenuation measurement. The electronics-related errors may not affect the phase difference measurement.

When in the Mini-MPR mode, the two transmitters 55A, 55B may be placed symmetrically with respect to the receiver antennas 57A, 57B. Attenuation and phase difference are measured for each of the transmitters 55A, 55B. The measurements may be averaged to give the final readings:

$$Att = \frac{Att_{T1} + Att_{T2}}{2}; \quad (2)$$

$$Pha = \frac{Pha_{T1} + Pha_{T2}}{2}$$

where the subscripts T1 and T2 denote the first and second receivers. Assuming a uniform earth formation for which the magnetic fields at the receiver locations are $H_1$ and $H_2$ and assuming that the two receivers have gains $G_1$ and $G_2$, the ratio of the two receiver outputs $R_{T1}$ for the 1st transmitter may be derived from the ratio:

$$R_{T1} = \frac{G_2 H_2}{G_1 H_1} = \frac{G_2}{G_1} \frac{A_2}{A_1} e^{i\Delta\phi} \quad (3)$$

where $A_1$ and $A_2$ are the amplitudes of $H_1$ and $H_2$, respectively; $\Delta\phi$ is the phase difference between the two receivers. From eqn. (3) it follows $$Att_{T1} = -20\log\frac{G_2}{G_1} - 20\log\frac{A_2}{A_1}, \quad (4)$$

$$Pha_{T1} = \Delta\phi. \quad (5)$$

Thus, it is clear that the gain change affects attenuation measurement but not the phase difference measurement.

Similarly, attenuation measurement for the 2nd transmitter is derived from $$R_{T1} = \frac{G_1 H_2}{G_2 H_1} = \frac{G_1}{G_2} \frac{A_2}{A_1} e^{i\Delta\phi}. \quad (6)$$

The attenuation measurement may be written as:

$$Att_{T1} = -20\log\frac{G_1}{G_2} - 20\log\frac{A_2}{A_1}. \quad (7)$$

Averaging equations (3) and (4) may remove the effect of gain variation. Those versed in the art would recognize that measurements of amplitude and phase can, in addition to resistivity determination, also be used for determining the dielectric constant of the earth formation.

FIG. 3A shows a schematic of a generic tool configuration for one embodiment according to the present disclosure. Here, multiple receiver pairs of receivers may be used to achieve sufficient azimuthal coverage. Pad 51A may include two receiver arrays 103A, 103B. For each receiver 105 in the upper array 103A, there is a corresponding receiver 105 in the lower array 103B. In one embodiment, the coils 101A, 101B of the upper and lower receiver arrays may be aligned radially with respect to the tool axis (movement) direction. The receiver coils 105 are separated laterally by a constant distance that is determined by the azimuthal resolution of the electromagnetic tool. Two transmitting antennas 101A, 101B may be placed above receiver array 103A and below receiver array 103B. The transmitting antennas 101A, 101B may be operated one at a time during which measurements from each and every receiver pair are made. An exemplary current flow direction for the transmitters 101A, 101B is shown by the arrows in FIG. 3A. With the indicated current flow of the transmitters 101A, 101B and the coil orientation of the receivers 105, the measurements made would be xx-measurements. The measurements may include attenuation rate, phase difference, or compensated magnetic field.

FIG. 3B shows a schematic of another embodiment of a generic tool configuration with staggered receiver pairs according to the present disclosure. Depending on the size of the receiver coils 105, the receiver pairs may be staggered in the tool axis direction, allowing a small separation between the receiver pairs. The upper receiver array 103A' may comprise two staggered rows of receivers 105 and the lower receiver array 103B' may comprise two staggered rows of receivers 105 to reduce the gaps in azimuthal coverage of the configuration of FIG. 3A.

Figure 4B:
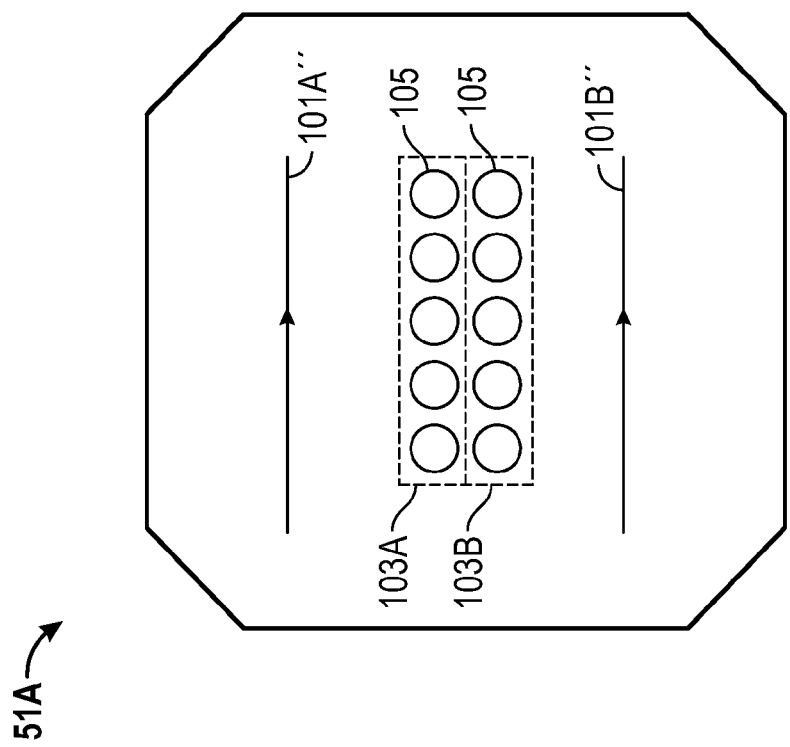
FIG. 4B is a schematic of an antenna configuration for a pad of an electromagnetic tool for another embodiment according to the present disclosure.
Figure 4A:
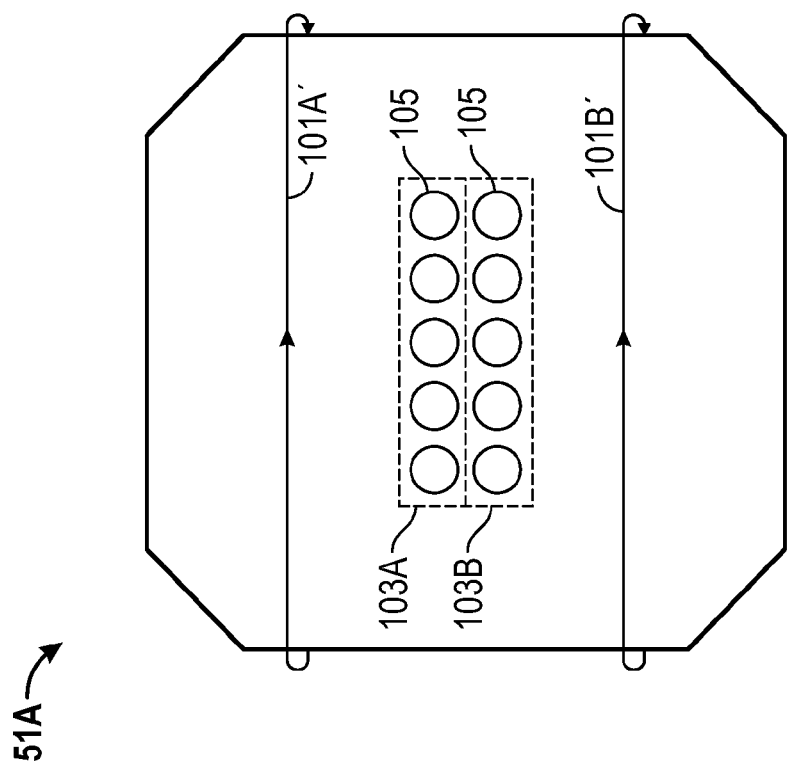
FIG. 4A is a schematic of an antenna configuration for a pad of an electromagnetic tool for another embodiment according to the present disclosure.

FIG. 4A is a schematic of a transmitter for one embodiment according to the present disclosure. Transmitters 101A' and 101B' may have wires wound around the pad 51A. The wire paths may be substantially normal to the tool axis, going in the front, back, and on sides of the pad 51A. With the configuration shown in FIG. 4A, the measurements would be zx-measurements.

FIG. 4B is a schematic of a transmitter for another embodiment according to the present disclosure. Transmitters 101A", 101B" may be electric dipoles normal to the tool axis.

The selection of the plurality of frequencies may include frequencies at or near the high frequency limit of the real part of dielectric permittivity for the particular polarization type of the earth formation. Several basic polarization types depending on colloid structure of oil, water contact with the containing porous medium, and water-oil contact in the containing medium can be identified. The physical bases in these cases correspond to migration polarization (the Maxwell-Wagner polarization) at the contacts between colloid particles in oil, polarization of the double layer and bulk charge at the contacts between water and the rock matrix of the containing porous medium, etc. Each polarization type may be identified with a specific structural unit of the medium and cataloged in the dielectric spectra. Determination of the particle type in the colloid solution in the porous medium may be then reduced to the problem of identification of the cataloged and the measured spectra. It should be noted that all polarization types can be reduced to the following three basic polarization types:

Havriliak-Negami relaxation (its specific cases are the Cole-Davidson, Debye, and Cole-Cole relaxations) characterized by frequency dependence of the complex value of dielectric permittivity may be expressed as:

$$\varepsilon^* = \varepsilon_\infty + (\varepsilon_s - \varepsilon_\infty)[1 + (i\omega\tau)^{1-\alpha}]^{-\beta} \quad (8)$$

$$\varepsilon^* = \varepsilon' - i\varepsilon'' \quad (9)$$

m-th power law relaxation $$\varepsilon^* = A \cdot (i\omega)^{-m} \quad (10)$$

Maxwell-Wagner relaxation $$\varepsilon^* = \varepsilon_\infty + 4\pi\sigma/i\omega + (\varepsilon_s - \varepsilon_\infty)/(1 + i\omega\tau) \quad (11)$$

Figure 5:
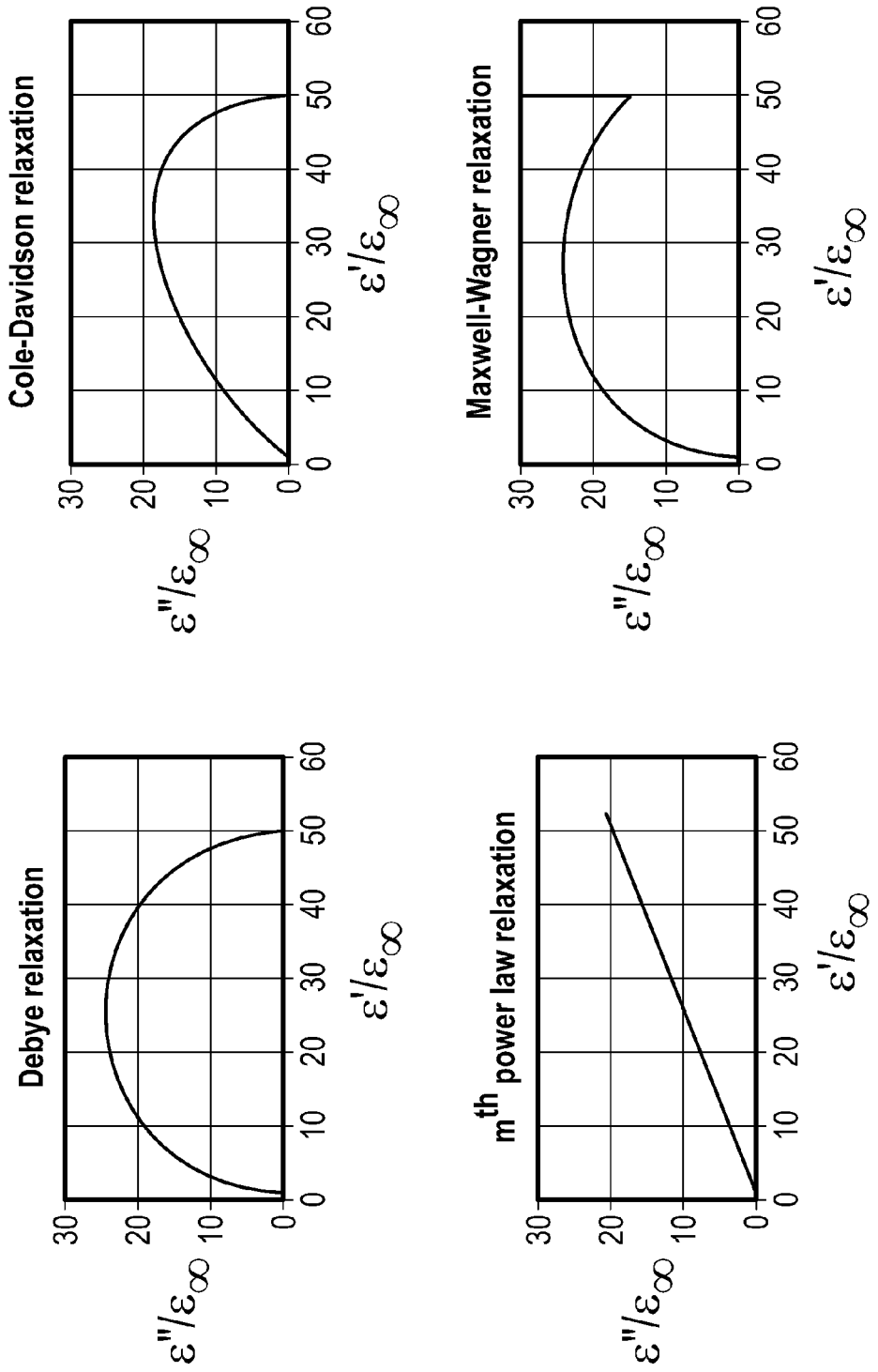
FIG. 5 is a set of graphs showing relaxations for different polarization types for one embodiment according to the present disclosure.

FIG. 5 shows a set of complex permittivity curves depicting spectral images of dielectric permittivity for different relaxations related to polarization types and associated with colloidal structure of fluid within a saturated porous medium. The Maxwell-Wagner relaxation determines the phase of colloid particles, the m-th power law relaxation corresponds to laminated or disk-shaped micellar colloid particles, the Debye relaxation corresponds to crystalline solid colloid particles, the Cole-Davidson relaxation corresponds to local crystalline structuring in colloid particles, etc. Having compiled the catalog of polarization types, the structure of water-oil mixture and colloid oil contents in the saturated porous medium may be identified. The structure of the water-oil mixture may be indicative of permeability of the earth formation. For example, water-saturated sandstones and dolomites may have a polarization type that demonstrates Cole-Cole relaxation. The polarization type may be identified using electromagnetic logging of the borehole.

One of the key problems of dielectric spectroscopy in the water- and oil-saturated porous media is finding surface tension as function of the frequency of the electromagnetic field from the dielectric spectra, more specifically, from the real and imaginary parts of dielectric permittivity. In the kHz range, fresh water-saturated porous media may be characterized by high dielectric permittivity (up to $10^3$-$10^4$) at characteristic relaxation frequencies.

Figure 6:
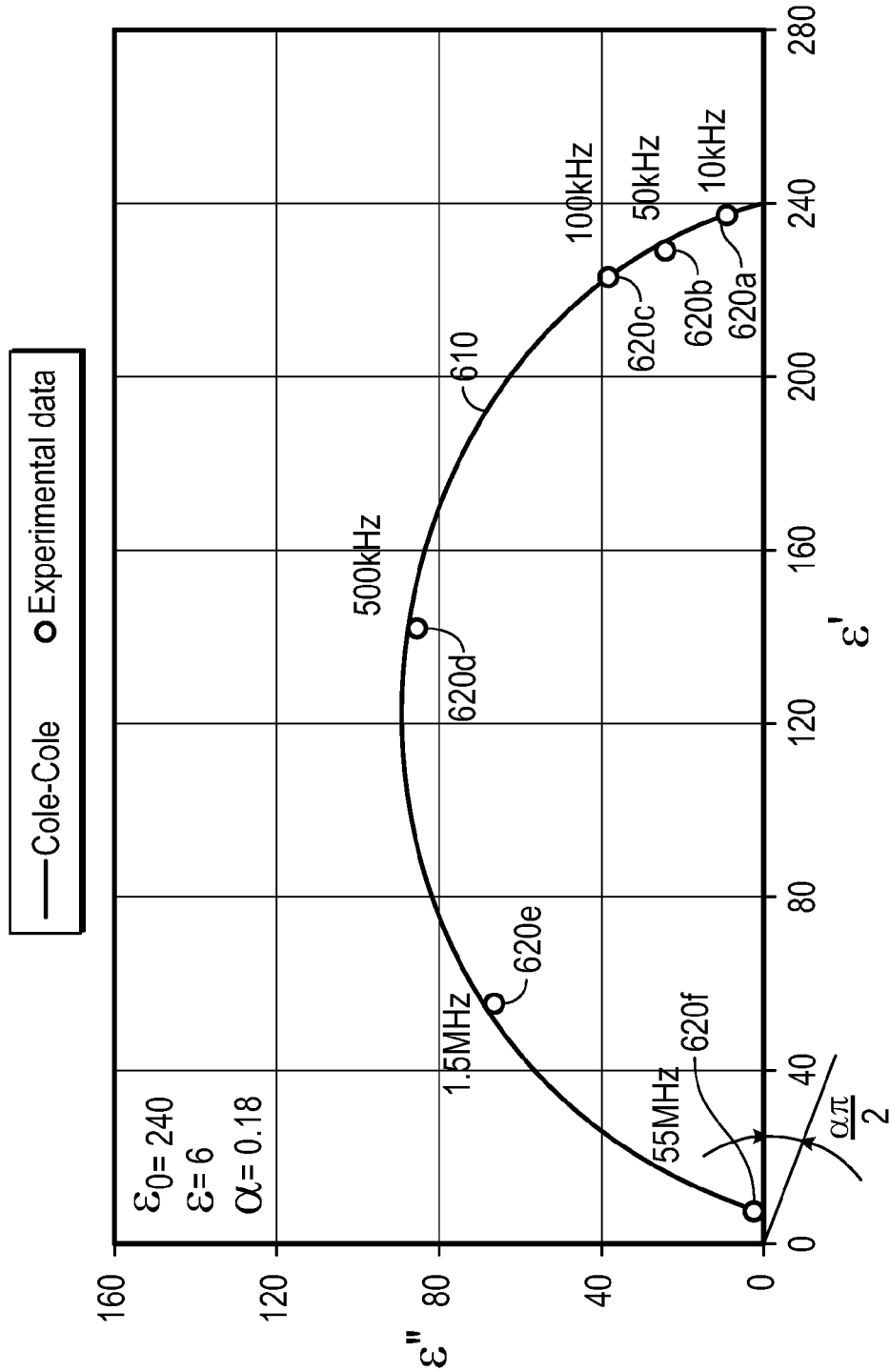
FIG. 6 is a graph of complex permittivity for water saturated dolomite for one embodiment according to the present disclosure.

FIG. 6 shows an exemplary set of curves for dolomite expressing complex dielectric permittivity over a range of frequencies. In water-saturated dolomite, the Cole-Cole relaxation is typically observed as shown in as curve 610. The dielectric spectra may be characterized by a symmetrical polarization curve of the Cole-Cole type (the curve on the plane $\varepsilon''$, $\varepsilon'$) as expressed by the formula:

$$\varepsilon = \varepsilon_\infty + \frac{\varepsilon_s - \varepsilon_\infty}{1 + (i\omega\tau)^{1-\alpha}} \quad (12)$$

where $\varepsilon$ is complex dielectric permittivity, $\varepsilon_\infty$ the asymptotic value of the real part of this polarization type at high frequencies, $\varepsilon_s$ is the static value of dielectric permittivity, $\tau$ is relaxation time, $\alpha$ is a parameter ranging from 0 to 1, which characterizes the polarization angle. It has been established experimentally that natural media like sandstones or dolomites demonstrate that the asymptotic value of the real part of dielectric permittivity depends only on water saturation of the pore space and does not depend on the saline concentration in saturating water and rock type. In other words, $\varepsilon_\infty$ is a universal function of water saturation of the porous rock. Frequency dependencies of the real and imaginary parts of dielectric permittivity for water-saturated formations (real part, imaginary part) shown in curve 610 appear to be symmetrical with respect to the maximum of the imaginary part of dielectric permittivity. Experimental data points 620a-f (at 10 kHz, 50 kHz, 100 kHz, 500 kHz, 1.5 MHz, and 55 MHz, respectively) confirm the close relationship between practice and the Cole-Cole relaxation in curve 610.

For Cole-Cole relaxation it is known that:

$$\varepsilon''_{max} = (\varepsilon_s - \varepsilon_\infty) \cdot \tan[(1-\alpha)\pi/4]/2 \quad (13)$$

where $\varepsilon''_{max}$ is the maximal loss factor, $\varepsilon_s$ is the static value of the real part of dielectric, $\varepsilon_\infty$ is its high-frequency limit, and $\alpha$ is the polarization parameter. It is also known, for Cole-Cole relaxation, that the following relationship is true.

$$\varepsilon_s = 2\varepsilon'_{max} - \varepsilon_\infty \quad (14)$$

Using eqns. (13) and (14), it follows that:

$$\varepsilon_\infty = \varepsilon'_{max} - \varepsilon''_{max}/\tan[(1-\alpha)\pi/4]/2 = \varepsilon_\infty(K) \quad (15)$$

where $\varepsilon_\infty(K)$ is a given universal function of water saturation (water fraction in percent). The universal curve $\varepsilon_\infty(K\%)$ may be obtained via laboratory experiments, and $\varepsilon''_{max}/\varepsilon'_{max}$, $\alpha$ may be obtained via inductive logging.

Figure 7:
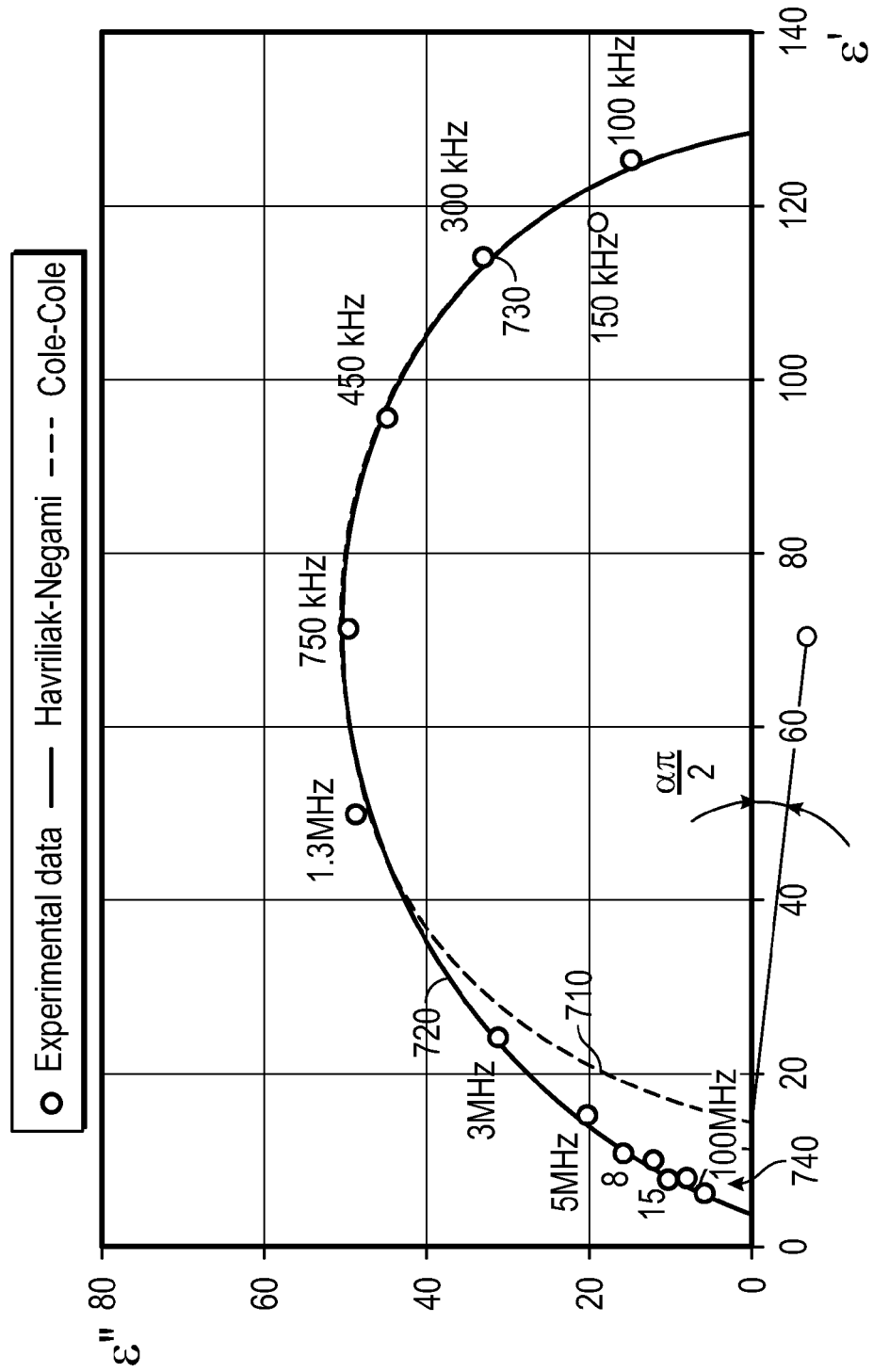
FIG. 7 is a graph of imaginary versus real parts of complex permittivity for water and water/oil saturated sandstone for one embodiment according to the present disclosure.

FIG. 7 shows an exemplary set of curves expressing dielectric permittivity over a range of frequencies in porous sandstone. Curve 710 represents the Cole-Cole relaxation curve that represents the presence of water but not oil in the porous space. The polarization curve following the Havriliak-Negami formula is shown as curve 720 represents the dielectric permittivity where both water and oil are present in the porous space. Curve 720 may be expressed as follows.

$$\varepsilon^* = \varepsilon_\infty + \frac{\varepsilon_s - \varepsilon_\infty}{[1 + (i\omega\tau)^{1-\alpha}]^\beta} \quad (16)$$

where there are two polarization parameters: $\alpha$ and $\beta$. The presence of the $\beta$ term may result in the high-frequency limit of the real part of complex dielectric permittivity depending in part on oil contents. The oil present in the pores along with water widens the frequency domain of the spectrum to the MHz frequency domain, introducing noticeable asymmetry to the Cole-Cole curve 710 and resulting in the dielectric polarization characterized by the Havriliak-Negami polarization curve 720. Experimental data points 730 confirm the close relationship with polarization curve 720 when water and oil saturate the porous medium. The asymmetry of curve 720 may result in a characteristic angle 740 in the MHz range of the electric field.

The characteristic angle 740 of the asymmetry of the curve 720 may be expressed as $$\frac{(1-\alpha)\beta\pi}{2}$$

in the MHz range of the electric field. The characteristic angle 740 and the limit value of dielectric permittivity, $\varepsilon_\infty$, in the high-frequency limit, may depend on oil viscosity and surface tension at the water-oil interface. The latter dependence enables us to find oil viscosity and surface tension at the water-oil interface from the measured polarization curve.

Comparative analysis of the spectral dependence of the water-and-oil-saturated porous media and the spectra of water-oil emulsions shows that, in the porous medium, oil seems to have the form of water-oil emulsion, i.e. there are droplets of oil in water inside the pores. The physics of polarization losses in the MHz range is as follows.

The Debye polarization (a special case of the Cole-Cole polarization with a single relaxation time of the corresponding distribution function) characterizes polarization in the system of independent oscillators in the external electric field. Asymmetry of the Debye polarization curve is related to the Cole-Davidson polarization curve. The physics behind this deformation of the polarization curve may be emerging non-linear interaction in the system of independent oscillators (polarizing dipoles in the external electric field). The analysis of the experimental spectral data for dielectric permittivity of the porous media saturated with water-oil mixture and for water-oil emulsions appears to indicate that, in the porous media, oil takes the form of droplets in water, i.e. a system similar to that of water-oil emulsions in the porous media.

In the presence of an alternating electric field applied to this system, each oil droplet may be considered a macroscopic dielectric dipole. The polarizing double electric layer next to the boundary of the oil droplet may have an electric charge, Q, which may be unevenly distributed over the surface of the droplet. Due to electric capillarity, the surface tension, σ, at the interface between water and oil may depend on the difference in electric potentials and, consequently, the gradient of surface tension along the surface of these droplets. Polarizing droplets may be engaged in the electrophoretic motion in the alternating electric field. This mutual motion may generate self-coordinated oscillations of water and droplets in the water saturating the porous body. Because the hydrodynamic flow streamlines around the oil droplets in the presence of the gradient of surface tension, this interaction may be described using a viscous fluid approximation. Therefore, the electrophoretic motion may lead to additional dispersion of dielectric permittivity constructed based on the viscous losses of the pulse in the oil droplets.

In the presence of surface tension, there will likely be conditions for considerable absorption of kinetic energy and, consequently, electric energy. Because the absorption instrument under consideration transforms due to the polarization mechanism, the dielectric spectra of such systems may carry all of the information on dielectric losses. Self-coordinated motion of droplets in the fluid flow around the droplet may lead to non-harmonic terms in the oscillating interaction energy of the droplets (non-linear interaction between electric dipoles), i.e. characteristic non-linearity leading to asymmetry of the polarization curve of the dielectric spectra.

Figure 8:
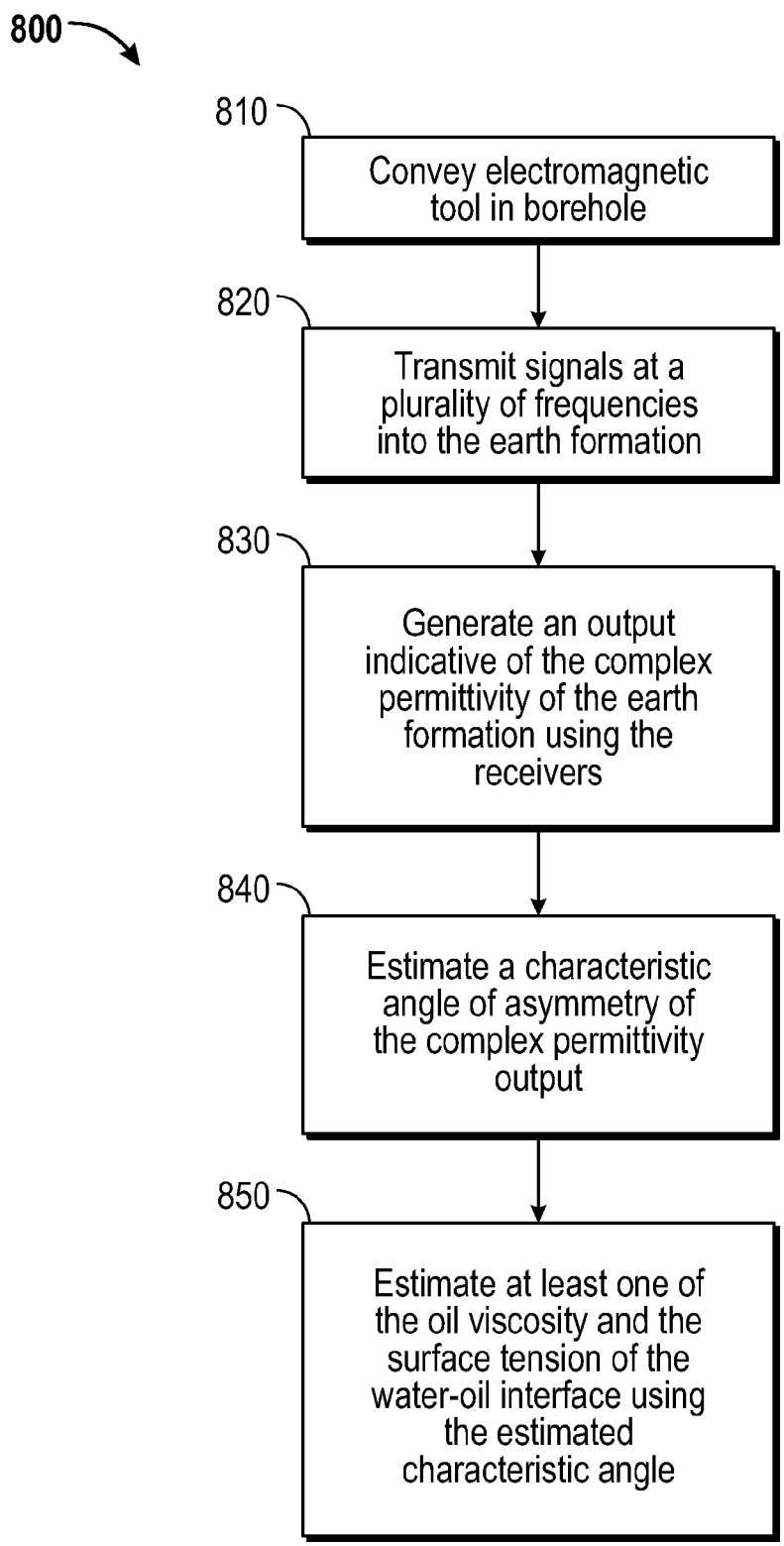
FIG. 8 is a flow chart for a method for one embodiment according to the present disclosure.

FIG. 8 is a flow chart of one method 800 for estimating a fluid saturation according to one embodiment of the present disclosure. In step 810, electromagnetic tool MA may be conveyed in the borehole 12. In step 820, signals at a plurality of frequencies may be transmitted from transmitters 101A, 101B into the earth formation. In some embodiments, at least one of the plurality of frequencies may be at a frequency at or above 500 MHz. In step 830, receivers 103A, 103B may generate an output indicative the complex dielectric permittivity of the earth formation 13. In step 840, a characteristic angle 740 may be estimated using the generated output. In step 850, at least one of the oil viscosity and the surface tension of the water-oil interface may be estimated using the estimated characteristic angle. In some embodiments, the characteristic angle 740 may be estimated using an output in the form of a Havriliak-Negami polarization curve, such as with sandstone. One of skill in the art, with the benefit of the teachings in this disclosure, would understand that different polarization curves may be used depending on lithology, such as, but not limited to, the Cole-Davidson polarization curve.

As described herein, the method in accordance with the presently disclosed embodiment of the disclosure involves several computational steps. As would be apparent by persons of ordinary skill, these steps may be performed by computational means such as a computer, or may be performed manually by an analyst, or by some combination thereof. As an example, where the disclosed embodiment calls for selection of measured values having certain characteristics, it would be apparent to those of ordinary skill in the art that such comparison could be performed based upon a subjective assessment by an analyst or by computational assessment by a computer system properly programmed to perform such a function. To the extent that the present disclosure is implemented utilizing computer equipment to perform one or more functions, it is believed that programming computer equipment to perform these steps would be a matter of routine engineering to persons of ordinary skill in the art having the benefit of the present disclosure.

Implicit in the processing of the acquired data is the use of a computer program implemented on a suitable computational platform (dedicated or general purpose) and embodied in a suitable machine readable medium that enables the processor to perform the control and processing. The term "processor" as used in the present disclosure is intended to encompass such devices as microcontrollers, microprocessors, field-programmable gate arrays (FPGAs) and the storage medium may include ROM, RAM, EPROM, EAROM, solid-state disk, optical media, magnetic media and other media and/or storage mechanisms as may be deemed appropriate. As discussed above, processing and control functions may be performed downhole, at the surface, or in both locations.

From the foregoing disclosure, it should be apparent that a method and apparatus for evaluating an earth formation has been disclosed involving the measurement of electrical characteristics including formation dielectric permittivity and involving measurements taken at a plurality of measurement frequencies.

Although a specific embodiment of the disclosure as well as possible variants and alternatives thereof have been described and/or suggested herein, it is to be understood that the present disclosure is intended to teach, suggest, and illustrate various features and aspects of the disclosure, but is not intended to be limiting with respect to the scope of the disclosure, as defined exclusively in and by the claims, which follow.

While the foregoing disclosure is directed to the specific embodiments of the disclosure, various modifications will be apparent to those skilled in the art. It is intended that all such variations within the scope of the appended claims be embraced by the foregoing disclosure.

What is claimed is:

1. A method of evaluating an earth formation, the method comprising:

making measurements if complex permittivity using an electromagnetic tool in a borehole penetrating the earth formation to transmit signals into the formation at a plurality of frequencies;

using at least one processor to estimate at least one property of the earth formation using a real part with respect to an imaginary part of a permittivity of the earth formation at the plurality of frequencies, where the real parts and the imaginary parts are based on the measurements, and wherein the at least one property includes at least one of: i) oil viscosity and ii) surface tension of a water-oil system; and using the at least one processor to perform at least one of: i) storing the at least one property in a computer memory; ii) transmitting the at least one property uphole; or iii) displaying of the at least one property to an operating engineer.

2. The method of claim 1, wherein the earth formation is a saturated porous medium.

3. The method of claim 2, wherein the saturation is substantially due to water and oil.

4. The method of claim 1, further comprising:
conveying the electromagnetic tool in the borehole.

5. The method of claim 1, further comprising:
using the electromagnetic tool for making the measurements at the plurality of frequencies.

6. The method of claim 1, wherein using the real parts and the imaginary parts comprises:
generating a spectral dielectric curve of the real part of the permittivity with respect to the imaginary part of the permittivity for the plurality of frequencies;
estimating a high-frequency limit for the real parts using the spectral dielectric curve; and
estimating an angle between the spectral dielectric curve and an axis formed at the high-frequency limit.

7. The method of claim 1, wherein the electromagnetic tool uses electrical induction.

8. An apparatus for evaluating an earth formation, the apparatus comprising:
a carrier configured to be conveyed in a borehole penetrating the earth formation;
a electromagnetic tool disposed on the carrier and configured to make measurements of complex permittivity indicative of an imaginary part and a real part of a permittivity of the earth formation by transmitting signals into the formation at a plurality of frequencies; and
at least one processor configured to:
estimate the real part and the imaginary part of the permittivity of the earth formation at the plurality of frequencies, and
estimate at least one property of the earth formation using the real parts and imaginary parts by using the real part of the permittivity with respect to the imaginary part of the permittivity for the plurality of frequencies, and wherein the at least one property includes at least one of: i) oil viscosity and ii) surface tension of a water-oil system; and
perform at least one of: i) storing the at least one property in a computer memory; ii) transmitting the at least one property uphole; or iii) displaying of the at least one property to an operating engineer.

9. The apparatus of claim 8, wherein the earth formation is a saturated porous medium.

10. The apparatus of claim 9, wherein the saturation is substantially due to water and oil.

11. The apparatus of claim 8, wherein the at least one processor is further configured to:
generate a spectral dielectric curve of the real part of the permittivity with respect to the imaginary part of the permittivity for the plurality of frequencies;
estimate a high-frequency limit for the real parts using the spectral dielectric curve; and
estimate an angle between the spectral dielectric curve and an axis formed at the high-frequency limit.

12. The apparatus of claim 8, wherein the electromagnetic tool is configured to use electric induction.

13. A non-transitory computer-readable medium product having instruction thereon that, when executed, cause at least on processor to perform a method, the method comprising:
estimating, with measurements of complex permittivity using an electromagnetic tool in a borehole penetrating the earth formation to transmit signals into the formation at a plurality of frequencies, at least one property of the earth formation using a real part with respect to an imaginary part of a permittivity of the earth formation at the plurality of frequencies, where the real parts and the imaginary parts are based on the measurements, and wherein the at least one property includes at least one of: i) oil viscosity and ii) surface tension of a water-oil system; and
using the at least on processor to perform at least one of: i) storing the at least one property in a computer memory; ii) transmitting the at least one property uphole; or iii) displaying of the at least one property to an operating engineer.

14. The non-transitory computer-readable medium product of claim 13 further comprising at least one of: (i) a ROM, (ii) and EPROM, (iii) an EEPROM, (iv) a flash memory, or (v) and optical disk.

* * * * *

UNITED STATES PATENT AND TRADEMARK OFFICE
CERTIFICATE OF CORRECTION

PATENT NO. : 9,581,720 B2
APPLICATION NO. : 13/991029
DATED : February 28, 2017
INVENTOR(S) : Vitaly N. Dorovsky It is certified that error appears in the above-identified patent and that said Letters Patent is hereby corrected as shown below:

In the Claims

At Column 10, Line 56, in Claim 1, please remove the word "if" and insert therefor -- of --.

At Column 12, Line 23, in Claim 13, please remove the word "on" and insert therefor -- one --.

At Column 12, Line 36, in Claim 13, please remove the word "on" and insert therefor -- one --.

At Column 12, Line 44, in Claim 14, please remove the word "and" and insert therefor -- an --.

Signed and Sealed this
Eleventh Day of April, 2017

Michelle K. Lee
*Director of the United States Patent and Trademark Office*